United States Patent [19]

Kouba

[11] 4,210,836
[45] Jul. 1, 1980

[54] PERMANENT MAGNET GENERATOR

[75] Inventor: Carroll C. Kouba, Fort Shawnee, Ohio

[73] Assignee: Westinghouse Electric Corp., Pittsburgh, Pa.

[21] Appl. No.: 894,879

[22] Filed: Apr. 10, 1978

[51] Int. Cl.² .............................................. H02K 19/12
[52] U.S. Cl. .................................... 310/112; 310/183; 310/165
[58] Field of Search ............... 310/181, 182, 183, 155, 310/154, 168, 112, 256, 68 R, 680, 165; 322/46

[56] References Cited

U.S. PATENT DOCUMENTS

| 626,172 | 5/1899 | Lamme | 310/183 |
|---|---|---|---|
| 1,082,532 | 12/1913 | Lamme | 310/183 |
| 1,366,475 | 1/1921 | Milton | 310/155 |
| 2,814,745 | 11/1957 | Sinclair, Jr. | 312/183 X |
| 3,010,040 | 11/1961 | Braun | 310/181 X |
| 3,562,568 | 2/1971 | Susdorf et al. | 310/182 X |
| 3,876,927 | 4/1975 | Gee et al. | 310/155 X |

*Primary Examiner*—Donovan F. Duggan
*Attorney, Agent, or Firm*—G. H. Telfer

[57] ABSTRACT

A permanent magnet generator is provided which is intended for use in close physical relation to an associated main generator, such as an aircraft generator. To prevent severe modulation of the output voltage of the permanent magnet generator due to stray magnetic fields from the main generator, short-circuited windings are provided encircling the magnetic circuit of the permanent magnet generator in a manner to minimize the effect of such stray magnetic fields.

4 Claims, 3 Drawing Figures

U.S. Patent
Jul. 1, 1980
4,210,836
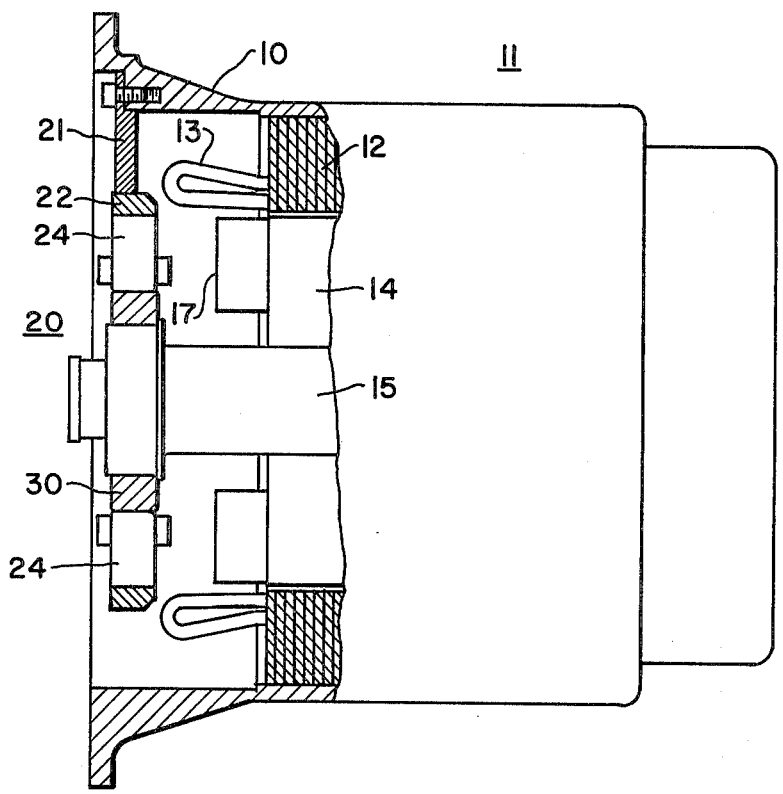
Fig. 1
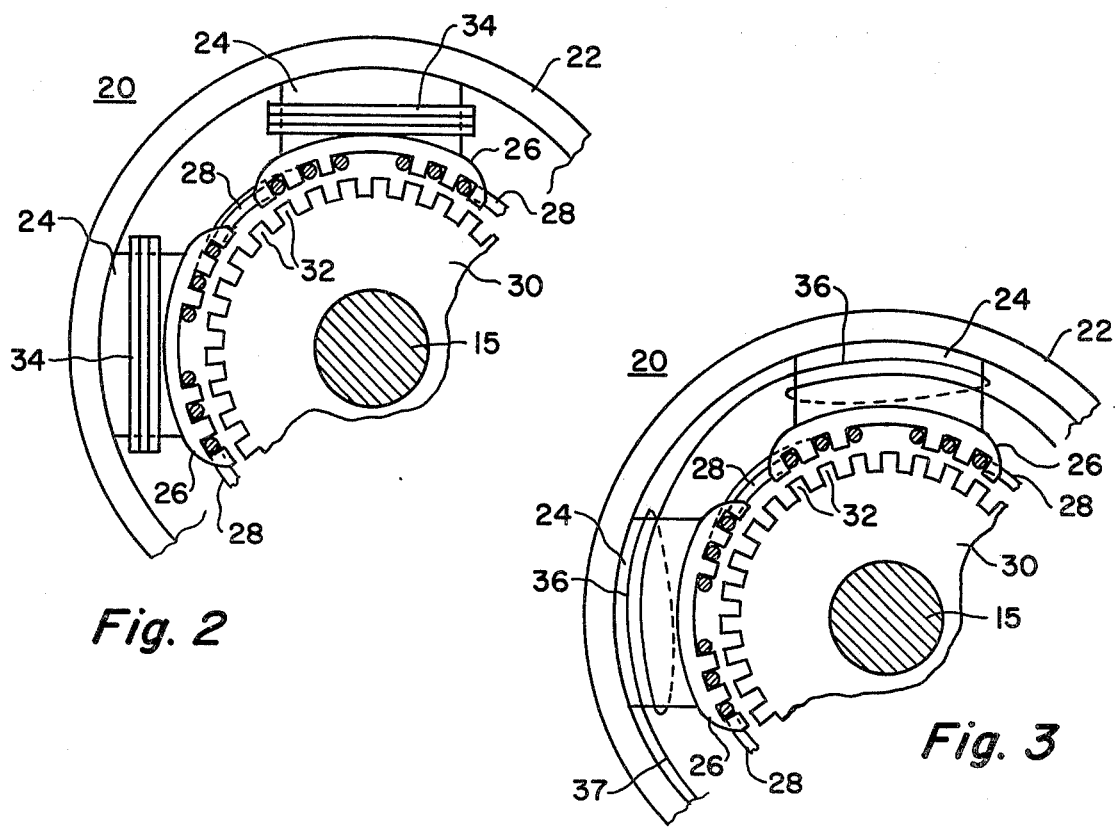
Fig. 2
Fig. 3

PERMANENT MAGNET GENERATOR

BACKGROUND OF THE INVENTION

The present invention relates to permanent magnet generators and, in particular, to generators of this type intended for use as auxiliary machines in association with larger main generators and in close physical proximity thereto.

Permanent magnet generators of relatively small size are often used as auxiliary machines to supply excitation or control power, or for other purposes, in association with a larger main generator. Such machines are frequently used, for example, in connection with aircraft generators. Since the size and weight of aircraft generators must be kept as small as possible, the auxiliary permanent magnet generator is built into a common housing with the main generator so that it is closely physically associated therewith. It has been found that severe modulation, or fluctuation, of the output voltage of such auxiliary machines frequently occurs at the frequency of the main machine and may be as great as 40% 50% of the nominal voltage. It has also been found that the permanent magnet generator can be partially demagnetized when a short-circuit occurs on the output terminals of the main generator.

These effects are, of course, highly undesirable but they are due to the necessarily close physical proximity of the permanent magnet generator to the field winding and the alternating current armature winding of the main generator. This physical relation causes the auxiliary permanent magnet generator to be within the range of stray magnetic fields of the main generator windings which are strong enough to cause both fluctuations in the output voltage of the auxiliary generator and partial demagnetization of the permanent magnets in its magnetic circuit. The dimensional limitations which these machines must meet, to be acceptable for aircraft use, are such that this close physical relation of the auxiliary generator and the main generator is necessary and the auxiliary generator cannot be spaced far enough away from the main machine to avoid the stray magnetic fields. It has been proposed to overcome this problem by means of copper shields placed between the auxiliary and main generators, but such shields do not greatly reduce the modulation of the auxiliary generator output voltage and add undesirable weight to the complete assembly.

SUMMARY OF THE INVENTION

The present invention provides a permanent magnet generator, for use as an auxiliary generator in close physical proximity to a main generator, in which the permanent magnet generator is magnetically shielded in a manner which minimizes or greatly reduces the effects of stray magnetic fields from the main machine and without adding excessive weight.

In accordance with the invention, short-circuited windings are provided which encircle the magnetic circuit of the permanent magnet generator in such a manner that currents induced in the short-circuited windings by stray fields produce magnetic fluxes which oppose the stray fields and thus tend to eliminate their effects. The short-circuited windings may be placed anywhere on the magnetic circuit of the generator where the magnetic flux is normally constant and where the winding can completely enclose the magnetic path. In the case of a generator in which the permanent magnets are utilized as salient pole members, the winding may consist of a short-circuited turn or turns placed on each such magnet closely adjacent the airgap, or may consist of windings encircling all of the magnets in series and arranged to have additive induced voltages. In either case, the short-circuited winding results in magnetic fluxes opposing the stray magnetic fields to which the generator is subjected, and thus eliminates or greatly reduces the effects of such stray fields.

BRIEF DESCRIPTION OF THE DRAWINGS

The invention will be more fully understood from the following detailed description, taken in connection with the accompanying drawings, in which:

FIG. 1 is a side elevation, partly in section, of a typical aircraft generator assembly including an auxiliary permanent magnet generator embodying the invention;

FIG. 2 is an end view showing the construction of the permanent magnet generator; and FIG. 3 is a similar view showing an alternative embodiment.

DESCRIPTION OF THE PREFERRED EMBODIMENT

As previously explained, the invention is intended for use in permanent magnet generators of relatively small physical size used in association with a larger main generator, and is particularly suitable for generators of this type for aircraft use. A typical complete aircraft generator assembly is shown in FIG. 1. Such a machine includes a common housing 10 in which is mounted a main alternating current generator 11 of any suitable type. The generator 11 is shown as having a stator core 12 with alternating current armature windings 13 placed in longitudinal slots in the usual manner. A rotor member 14 is mounted on a shaft 15 suitably supported in bearings (not shown) and may have salient pole members with direct current field windings 17 thereon. The main generator 11 may be of any usual or desired type and has not been shown in detail. Other associated equiment, such as a main exciter and rotating rectifier assembly, may also be driven by the shaft 15 and mounted in the common housing 10, but has not been shown since it is not a part of the present invention.

In machines of this type, an auxiliary source of relatively small amounts of power is frequently needed to supply control power, or to function as a pilot exciter, or for other purposes. An auxiliary generator is usually provided for these purposes and is often of the permanent magnet type. Such a permanent magnet generator 20 is shown in FIG. 1 driven by the shaft 15 and supported in the generator housing 10 by struts 21 or in any other desired manner. It will be seen that the generator 20 is in close physical proximity to the main generator 11 in a position where it is subject to stray magnetic fields from both the armature winding 13 and the field winding 17 of the main generator, as discussed above. Because of the limitations on physical size and weight which must be met by an aircraft generator, however, it is not possible to move the generator 20 far enough away from the main generator windings to avoid the effects of these stray fields.

The generator 20 is shown in end elevation in FIG. 2, and is shown as a machine of the flux switch, or inductor alternator, type to produce a high-frequency alternating current output. The generator 20 has a generally cylindrical frame 22 of steel, or other suitable magnetic material, with a plurality of salient pole members mounted radially thereon. Each of the pole members consists of a permanent magnet 24 mounted on the frame 22 and extending radially inward, the machine shown being a four-pole machine with four such permanent magnet poles of alternating polarity. Each of the permanent magnet pole members 24 has a pole face portion 26 of magnetic material mounted thereon and having slots in the pole face in which an output winding 28 is disposed. The winding 28 may be any suitable type of single-phase or poly-phase winding suitably arranged in the pole face slots. The machine 20 also has a rotor member 30 mounted on the shaft 15 and having teeth 32 on its periphery. This is a well known type of machine in which rotation of the toothed rotor 30 causes a rapid variation or pulsation of the magnetic flux linking the output winding 28, and thus generates an alternating voltage in the winding of frequency determined by the speed of the shaft and the number of teeth 32.

It has been found that when a machine of this type is used as an auxiliary generator in an aircraft generator assembly, such as that of FIG. 1, severe modulation of the output voltage of the generator 20 is observed at the frequency of the main generator and may be as great as 40% to 50% of the nominal voltage. When the main generator 11 is in operation, a strong magnetic flux alternating or pulsating at the frequency of the main generator, usually 400 hertz, has been found to exist in the frame 22 of the auxiliary generator 20 where there should be only a substantially constant unidirectional flux. This alternating and variable magnetic flux in the permanent magnet machine results in the undesirable modulation of the output voltage mentioned above. It has also been found that if a three-phase short-circuit occurs at the output terminals of the main generator, a partial demagnetization of the permanent magnets of the machine 20 can occur. These undesirable effects are due to stray magnetic fields produced by the main windings 13 and field winding 17 of the main generator which are strong enough in the location of the generator 20 to produce these effects.

The effects of the stray fields produced by the main generator cannot be eliminated by moving the auxiliary generator farther away because of the space limitations. The present invention, however, provides an effective means of greatly reducing these effects. In accordance with the invention, short-circuited windings are placed around the magnetic circuit of the generator 20 in such a manner as to shield it from the stray fields of the main generator. Such windings may be placed in any location on the magnetic circuit of the machine 20 where the magnetic flux is normally constant and unidirectional. The most effective and preferred location, however, is that shown in the drawings. As shown in FIG. 2, a short-circuited winding 34 is placed on each of the permanent magnet pole members 24 as close as possible to the airgap. The windings 34 may consist of a single turn or several turns of highly conductive material, such as copper wire or other suitable conductor, wrapped around each of the permanent magnets in the position shown with the ends joined together to form a short-circuited winding.

An alternative arrangement of the short-circuited windings is shown in FIG. 3 which shows a continuous winding consisting of a turn or turns 36 of a suitable conductor 37 wrapped around each of the pole members 24 and extending continuously from pole to pole around the machine. The turns 36 are in the same location as in FIG. 2, and are all connected together in series so that their induced voltages are additive. The ends of the winding are connected together so that a continuous short-circuited winding is provided extending around the machine which is equivalent in its magnetic effect to the winding of FIG. 2.

In the arrangements of both FIGS. 2 and 3, stray time-varying magnetic fields linking the short-circuited windings induce voltages in these windings which result in magnetic fluxes opposing the flux of the stray fields. Since the short-circuited windings completely encircle the magnetic circuit or circuits of the generator 20, the effect is to substantially eliminate, or at least greatly reduce, the effect of the stray magnetic fields to which the generator 20 is subjected. Thus, tests have shown that with short-circuited windings on the pole members 24, modulation of the output voltage of the generator 20 due to stray magnetic fields can be reduced to less than 30% of its previous value, which is small enough to be tolerated. No measurable demagnetization of the permanent magnets 24 occurred even after a three-phase short-circuit was applied to the main generator terminals. Thus, very effective magnetic shielding is provided which substantially eliminates the problem of voltage modulation in auxiliary permanent magnet generators in close physical proximity to a main generator. It has been proposed to provide magnetic shielding for such machines by means of a copper shield placed between the auxiliary generator and the main generator. Such a shield, however, is much less effective, although some reduction in the modulation may be obtained, while the weight of such a shield is at least three times that of the short-circuited windings herein disclosed, which is an important consideration in aircarft equipment. The present invention, therefore, provides a permanent magnet generator which is shielded against the effects of stray magnetic fields in a more effective manner than has previously been possible.

What is claimed is:

1. A dynamoelectric machine comprising: a main generator and an auxiliary generator within a common housing; said main generator comprising a rotor and a stator respectively including field and armature windings that produce magnetic fields; said auxiliary generator comprising a rotor mounted for rotation on a common shaft with said rotor of said main generator and a stator including a plurality of radially disposed permanent magnet pole members with a pole face portion of magnetic material at the inner extremity of each pole member, said pole members connected into a magnetic circuit at their outer periphery, and an output winding located in said pole face portions; the magnetic circuit of said auxiliary generator stator being located within said magnetic fields produced by said main generator windings; and a short-circuited conducting means encircling each of said auxiliary generator pole members for minimizing the effects of said magnetic fields on said magnetic circuit of said auxiliary generator.

2. A dynamoelectric machine as defined in claim 1 wherein: said short-circuited conducting means comprises a winding encircling each of said permanent magnet pole members adjacent the radially inner end.

3. A machine as defined in claim 2 in which said winding comprises a plurality of turns of a conductor encircling each magnet and connected in a closed, short-circuited coil.

4. A machine as defined in claim 2 in which said winding comprises a multi-turn coil on each magnet, all of said coils being connected in a continuous series circuit to form a closed, short-circuited winding.

* * * * *